US007810466B2

(12) United States Patent
Preimesberger et al.

(10) Patent No.: US 7,810,466 B2
(45) Date of Patent: Oct. 12, 2010

(54) COMPOUND BRACKET SYSTEM

(75) Inventors: Erich R. Preimesberger, Bolingbrook, IL (US); Donald M. Fenton, Park Ridge, IL (US); Trinadh Koppireddy, Andrha Pradesh (IN); Jayakumar Krishnaswami, Westmont, IL (US); Martin Wu, Naperville, IL (US); Zeguang Tao, Lisle, IL (US); Lezza Mignery, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 879 days.

(21) Appl. No.: 11/687,100

(22) Filed: Mar. 16, 2007

(65) Prior Publication Data

US 2008/0223329 A1 Sep. 18, 2008

(51) Int. Cl.
*F16M 1/00* (2006.01)
*F02B 33/00* (2006.01)

(52) U.S. Cl. .............................. 123/195 A; 123/195 R; 123/184.31; 60/598; 60/798; 248/674

(58) Field of Classification Search ............. 123/195 A, 123/198 R, 184.1, 559.1, 568.11, 568.12; 60/FOR. 114, 799, 798, 796, 604, 598; 248/637, 248/638, 639, 640, 674
See application file for complete search history.

(56) References Cited

U.S. PATENT DOCUMENTS 3,673,798 A * 7/1972 Kuehl ........................ 60/605.1
5,219,138 A * 6/1993 Shier et al. ............. 248/222.14
6,305,168 B1 * 10/2001 Furukawa .................. 60/605.1
6,360,541 B2 * 3/2002 Waszkiewicz et al. ....... 60/605.2
6,430,929 B2 * 8/2002 Martin ...................... 60/605.2
6,474,305 B1 * 11/2002 Kimura ...................... 123/456
7,043,915 B2 * 5/2006 Anello ...................... 60/605.3
7,051,786 B2 * 5/2006 Vuk ............................ 165/41
2007/0151242 A1 * 7/2007 Trondle et al. ............. 60/605.1

* cited by examiner

*Primary Examiner*—Michael Cuff
*Assistant Examiner*—Hung Q Nguyen
(74) *Attorney, Agent, or Firm*—Jack D. Nimz; Jeffery P. Calfa

(57) ABSTRACT

A compound bracket system (400) for an internal combustion engine (100) includes a first bracket (112) that is rigidly connected to a crankcase (102) of the internal combustion engine (100). The first bracket (112) forms at least one mounting pad (310) that is arranged to connect to and support a first engine component (114). A second bracket (120) is connected to the crankcase (102) through at least one additional engine component (110). The second bracket (120) forms a component cavity (208) that is arranged to accept and support a second engine component (118). The first bracket (112) forms an interconnection pad (314), and the second component forms a strut (216) having a mounting tab (218). The mounting tab (218) is advantageously connected to the interconnection tab (314) with a fastener (422), thus increasing the rigidity of the second bracket (120) as mounted on the engine (100).

4 Claims, 3 Drawing Sheets

COMPOUND BRACKET SYSTEM

FIELD OF THE INVENTION

This invention relates to internal combustion engines, including but not limited to structures, or brackets, used to connect various components of the engine to an engine support structure.

BACKGROUND OF THE INVENTION

Support structures, commonly referred to as brackets, that are used to connect various engine components to other components on the engine are known. Brackets are typically used to mount onto a base engine structure, for example a crankcase, other engine components that are necessary for the operation of the engine. Such components that are typically mounted onto the base engine structure include turbochargers, Exhaust Gas Recirculation (EGR) coolers, oil coolers, electronic control modules (ECM), oil filters, and so forth.

Brackets used to mount components onto an engine are typically designed to comport with appropriate specifications that require that the mounting of the component does not subject the components to excessive vibration. As is known, engines generate vibrations during operation that may negatively affect components that are connected thereto.

Mechanical structures inherently posses a natural vibration frequency that is exhibited at times when the structures are vibrationally excited along one or more directions. These natural frequencies, or modes, are vibrations that cause a maximum amplitude of vibration along an axis of excitation. Components vibrating at or close to their natural frequency experience increased amplitudes and increased accelerations, both of which are undesirable and detrimental to the component's operation and longevity of service.

When an engine operates, the vibrational excitation it produces is measurable and quantifiable. The vibrational input an engine will impart to components that are mounted thereto is typically analogous to a range of engine speeds the engine is capable of operating under. Similarly, the natural frequencies of various components in their as-mounted state on the engine is determinable with experimentation or simulation. A specification for mounting a component onto an engine will typically specify that the natural frequency of the component, as mounted on the engine, should fall outside of the expected range of vibration that the engine will produce during operation.

In situations where the natural frequency of a component falls within the range of expected vibrations the engine will produce during operation, one typically engages in an iterative process of design and simulation that will produce a bracket design that can increase or reduce the natural frequency of a system that includes the bracket and the component such that it falls outside of the expected range of vibrational input from the engine into the component. Brackets are usually designed such that their rigidity is increased so that their natural frequency increases enough to fall outside of the maximum frequency of excitation the engine is expected to produce.

Even though brackets that are designed stiffly enough to increase their natural frequency to fall outside of the range of excitation frequencies of the engine are effective at reducing or eliminating excessive vibration of components, such brackets are often relatively larger and heavier than what is required to maintain component mounting in a static condition. Large and heavy brackets cause an increase in cost of manufacture of an engine and a decrease in fuel economy of the engine due to their larger size and weight.

SUMMARY OF THE INVENTION

A compound bracket system for an internal combustion engine includes a first bracket that is rigidly connected to a crankcase of the internal combustion engine. The first bracket forms at least one mounting pad that is arranged to connect to and support a first engine component. A second bracket is connected to the crankcase indirectly through at least one or more additional engine component(s), and thus its connection to the crankcase is not as rigid as that of the first bracket. The second bracket forms a component cavity that is arranged to accept and support a second engine component. The first bracket forms an interconnection pad, and the second component forms a strut having a mounting tab. The mounting tab is advantageously connected to the interconnection pad with a fastener, thus increasing the rigidity of the second bracket as mounted on the engine.

DESCRIPTION OF A PREFERRED EMBODIMENT

The following describes an apparatus for mounting components onto an internal combustion engine. In a preferred embodiment, the apparatus includes a compound bracket system that is capable of rigidly mounting various engine components onto an engine such that a natural frequency of the components and the bracket system is outside of an excitation frequency range of the engine during operation. The bracket system is advantageously light and simple as compared to known bracket systems that are used to rigidly mount components onto engines.

Figure 1:
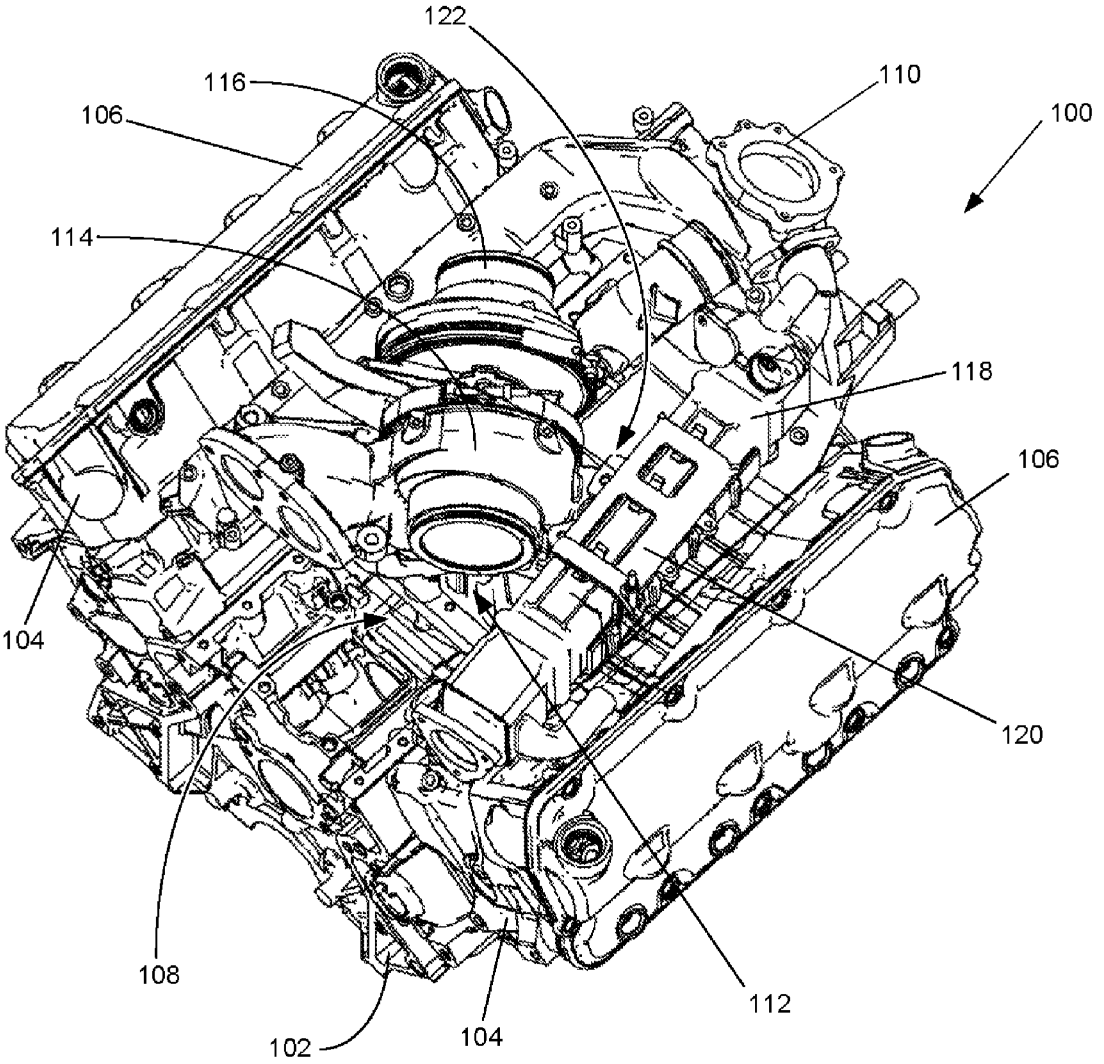
FIG. 1 is an outline view of an internal combustion engine having a compound bracket system in accordance with the invention.

An outline view of an internal combustion engine 100 is shown in FIG. 1. The engine 100 shown has two banks of cylinders arranged in a "V" configuration, but as it will become evident to one having skill in the art, the advantages of this invention may be realized for engines having other configurations, for example, engines having cylinders arranged in an inline or "I" configuration. The engine 100 includes a base engine structure or crankcase 102. A set of cylinder heads 104, each having a valve cover 106 attached thereon, are connected to the crankcase 102. The crankcase 102 has a valley portion 108 disposed between each of the cylinder heads 104. An intake manifold 110 having a "U" shape is connected to each of the cylinder heads 104 and has a central opening that is located around the valley portion 108 of the crankcase 102.

A turbocharger support bracket 112 is connected to the crankcase 102 at the valley portion 108 thereof. The turbocharger bracket connects a turbine 114 and a compressor 116 assemblies to the crankcase 102. An exhaust gas recirculation (EGR) cooler 118 is connected to the intake manifold 110 through an EGR cooler bracket 120. The EGR cooler bracket 120 is part of an EGR cooler mounting apparatus, which is described in more detail below. The EGR cooler bracket 120 is advantageously connected with the turbocharger support bracket 122 with a set of protruding tabs 122. It is desirable to rigidly mount both the turbine 114 and EGR cooler 118 to the crankcase 102.

The turbine 114 advantageously has access to a mounting location on the crankcase 102, in this case the valley portion 108, and is connected thereto with the turbocharger support bracket 112. The EGR cooler 118, though, would ordinarily be connected to the crankcase 102 through the intake manifold 110, which is connected to the cylinder head 104, which in turn is ultimately connected to the crankcase 102. By providing the protruding tabs 122 that connect the EGR bracket 120 to the turbocharger support bracket 112, a more direct connection to the crankcase 102 is advantageously provided for the EGR cooler 118. The interconnection or compounding of the turbocharger bracket 112 with the EGR cooler bracket 120 advantageously provides a more rigid connection of the turbine 114 and the EGR cooler 118 to the crankcase 102 without requiring the addition of more features and/or weight to each of the turbocharger support bracket 112 and the EGR cooler bracket 120.

Figure 2:
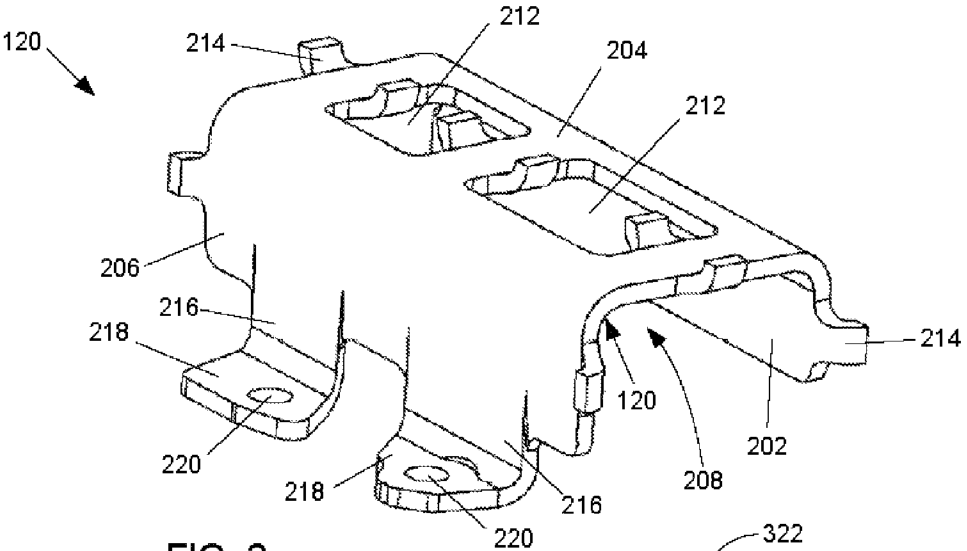
FIG. 2 is an outline view of a bracket having a strut with a tab for interconnection with another bracket in accordance with the invention.

An outline view of the EGR cooler bracket 120 is shown in FIG. 2. The EGR cooler bracket 120 in the embodiment shown is made of a single piece of material, preferably metal plate having a thickness of about ¼" (6.35 mm) that is bent in various locations to form a first side brace 202, a top brace 204, and a second side brace 206. The first side, top, and second side braces 202, 204, and 206 may be arranged such that a component cavity 208 is formed therebetween that is bound by the braces 202, 204, and 206 on three sides. In the embodiment shown where the bracket 120 is made of a single piece of metal plate, bend portions 210 are disposed between adjacent braces. A bend radius of each bend portion depends on a thickness of the material used to form the bracket 120.

The bracket 120 has a plurality of openings 212 and a plurality of guides 214 formed thereon. The openings 212, two of which can be seen on the top brace 204, are formed for accessibility and weight savings. The guides 214 protrude away from the bracket 120 on a side thereof opposite the component cavity 208. and help guide a plurality of band clamps (not shown) that are used to connect the bracket 120 to a component (not shown) occupying the component cavity 208 when in an assembled state.

The bracket 120 has a pair of struts 216 formed in the second side brace 206. The struts 216 are integrally formed with the second side brace 206, but may alternatively be formed as separate structures that are connected to the bracket 120, and/or be integrally formed with the bracket 120 but at a different location thereon. Additionally, less or more struts may be formed on the bracket 120. The number of struts used depends on the size of the bracket 120 and may also depend on the size and weight of the component mounted in the component cavity 208.

Each of the struts 216 has a tab 218 formed at a distal end thereof. Each tab 218 is bent away from the bracket 120 and forms an angle of about 90 degrees with respect to a major surface orientation of each of the side braces 202 and 206, although other orientations for the tabs 218 may be used. Each tab 218 has a fastener opening 220 formed therein and arranged to allow a fastener to pass through the bracket 120 for fastening on a mating component. Alternatively, the openings 220 may be open slots or have any other configuration that allows for fastener engagement or connection. The tabs are arranged and constructed to provide structural support to the bracket 120 through the struts 216.

Figure 3:
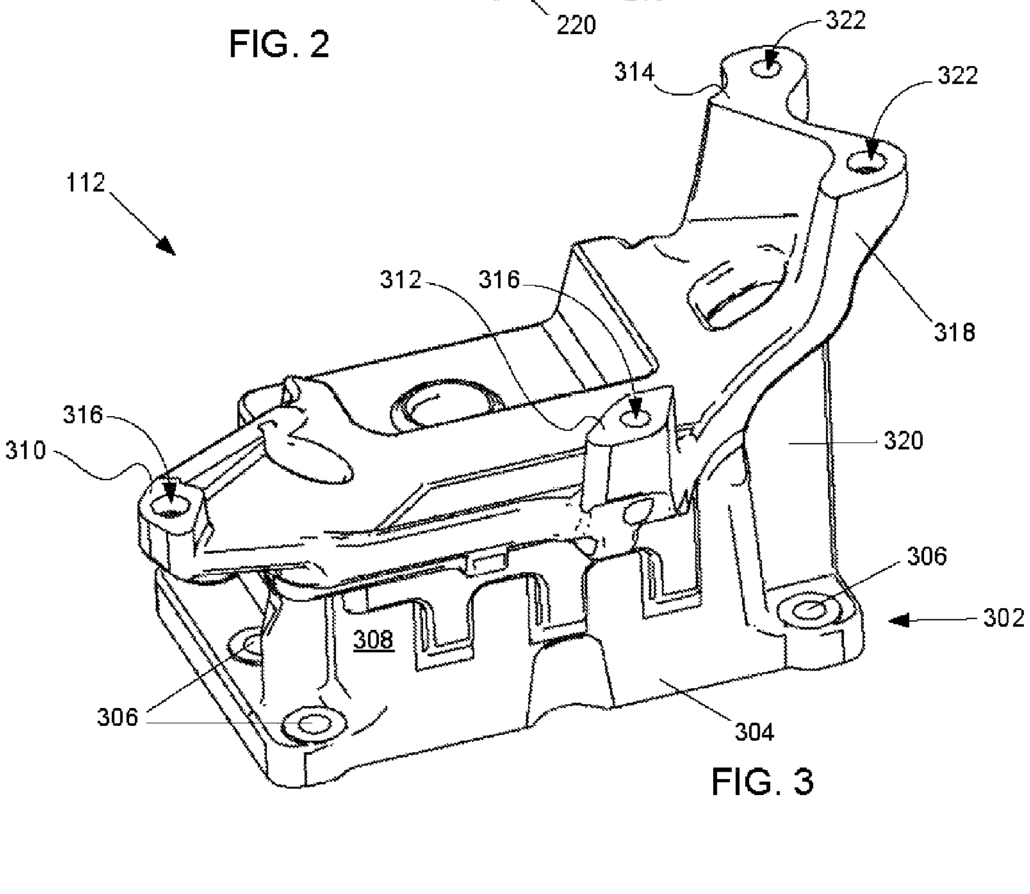
FIG. 3 is an outline view of a turbocharger support bracket having an interconnection pad for connection with another bracket in accordance with the invention.

An outline view of the turbocharger support bracket 112 is shown in FIG. 3. The bracket 112 has an engine interface portion 302 that includes a flange 304 having a plurality of fastener openings 306 formed therein. The interface portion 302 is rigidly connected to the crankcase 102 of the engine 100 shown in FIG. 1. The connection between the bracket 112 and the crankcase 102 is accomplished by inserting a plurality of fasteners (not shown), one each through the plurality of openings 306, that threadably engage the crankcase 102.

The turbocharger support bracket 112 also includes a body portion 308 that connects the engine interface portion 302 with a first mounting pad 310, a second mounting pad 312, and a bracket interconnection pad 314. Each of the first and second mounting pads 310 and 312 is substantially flat, is parallel to the flange 304, and has a fastener opening 316 formed therein. The mounting pads 310 and 312 are used to connect the turbine 114 (shown in FIG. 1) to the bracket 112, and thus to the crankcase 102, with the use of fasteners (not shown) that threadably engage the fastener openings 316 of the bracket 112.

The bracket interconnection pad 314 in the embodiment shown is formed as a ledge on a protrusion 318 of the body portion 308. The protrusion 318 is additionally supported by a rib 320 that is formed as part of the body portion 308 of the bracket 112. The rib 320 advantageously directly connects and transfers loads from the flange 304, through the protrusion 318, and to the interconnection pad 314 such that anything connected to the interconnection pad 314 is rigidly connected to the flange 304, and thus, to the crankcase 102. The interconnection pad 314 has two fastener openings 322 formed therein. The fastener openings 322 are arranged for threaded engagement with fasteners.

Figure 4:
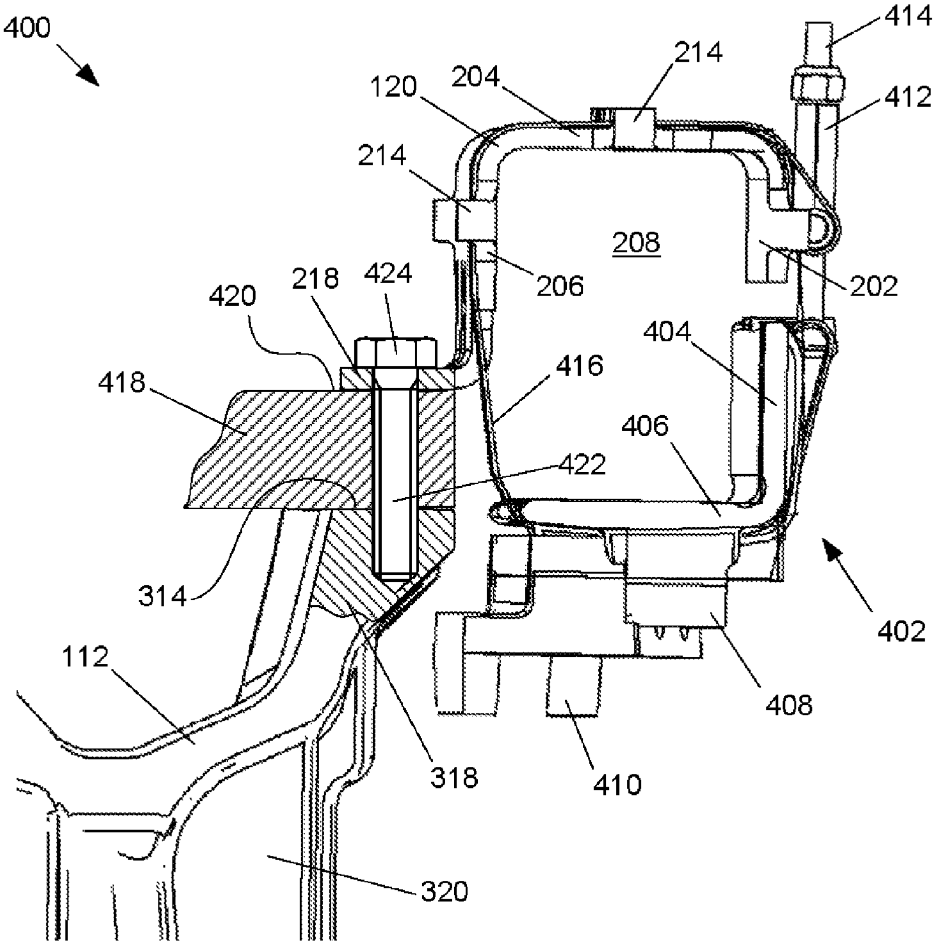
FIG. 4 is a partial cross-section view of a compound bracket system in accordance with the invention.

A partial cross-section view of the EGR support bracket 120 rigidly interconnected with the turbocharger support bracket 112 is shown in FIG. 4. The interconnection of the brackets 112 and 120 defines a compound bracket system 400 that is able to rigidly mount an engine component to the engine.

The compound bracket system 400 includes a lower EGR bracket 402. The lower EGR bracket 402 forms a first brace 404 that extends around the component cavity 208. A base brace 406 of the EGR base bracket 402 surrounds the component cavity 208 from a fourth side and is connected to an intake manifold mounting structure 408 that includes a plurality of mounting bosses 410. The mounting bosses 410 include fastener thru-holes (not shown) that are arranged to allow fasteners to pass therethrough. The fasteners threadably engage the intake manifold 110, shown in FIG. 1, and support the lower EGR bracket 402 onto the engine.

The EGR cooler bracket 120 and the lower EGR bracket 402 are held together surrounding an EGR cooler (not shown) that occupies the component cavity 208 by a band clamp 412. The band clamp 412, as is known, includes a bolt portion 414 that is connected to a band 416. The bolt portion 414 is capable of creating tension in the band 416 that is used to hold the brackets 120 and 402 securely around the component cavity 208 while advantageously allowing for some dislocation therebetween that is caused by dimensional tolerance, and/or thermal growth, and so forth. The band 416 extends below the base brace 406 and outside of the first brace 404 on the lower EGR bracket 402. The band 416 also extends outside of the first side brace 202, over the top brace 204, and outside of the second side brace 206 of the EGR cooler bracket 120. When the band 416 is subjected to tension, its relative position to the brackets 120 and 402 causes them to compress the component cavity 208 and thus retain a component that is located therein. The band 416 is located by being located between or adjacent the guides 214 that are formed in the EGR support bracket 120.

The turbocharger support bracket 112 has a portion 418 of the turbine 114 connected to the interconnection pad 314. The tab 218 of the EGR cooler bracket 120 rests on a top surface 420 of the portion 418 of the turbine 114. In an alternate embodiment, the tab 218 can be directly connected to the interconnection pad 314 of the turbocharger support bracket 112. A fastener 422 having a head portion 424 is shown installed. While in this assembled state, the fastener 422 is threadably engaged in the protrusion 318 of the bracket 112 and imparts a compressive load onto the tab 218 and the portion 418 through its head portion 424. This compressive load pushes the tab 218 and portion 418 together, and acts to keep them connected to the turbocharger bracket 112. The tab 218 acts to effectively mount a component disposed in the component cavity 208 of the EGR bracket 120 rigidly to the turbocharger support bracket 112, which is rigidly mounted to the crankcase 102 of the engine, as shown in FIG. 1. Moreover, the interconnection at the tab 218 between the EGR cooler bracket 120 and the turbocharger support bracket 112 effectively increases a mounting "footprint" of the EGR cooler bracket 120 thus increasing its natural frequency of vibration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An internal combustion engine comprising: a crankcase having a cylinder head connected thereto; a turbocharger support bracket connected to a valley portion of the crankcase through a mounting flange that is formed on the turbocharger support bracket, wherein the turbocharger support bracket forms at least one mounting pad and at least one interconnection pad;

a turbocharger that includes a turbine that is operably associated with a compressor, wherein the turbine is connected to the turbocharger support bracket at the at least one mounting pad;

an intake manifold connected to the cylinder head;

an exhaust gas recirculation (EGR) cooler support bracket connected to the intake manifold, wherein the EGR cooler support bracket is connected to an EGR cooler;

an interconnection tab disposed on a strut, wherein the strut is connected to the EGR cooler support bracket, and wherein the tab is connected to the interconnection pad of the turbocharger support bracket.

2. The internal combustion engine of claim 1, wherein the EGR cooler support bracket comprises a first bracket portion having the strut integrally formed therewith, and a second bracket portion that is connected to the intake manifold, further comprising a band clamp disposed around at least a portion of the first bracket portion and the second bracket portion, wherein the clamp is capable of connecting the first bracket portion and the second bracket portion such that the EGR cooler is retained therebetween.

3. The internal combustion engine of claim 1, wherein the interconnection tab is connected to the interconnection pad with a fastener, wherein the fastener passes through a fastener opening in the interconnection tab, and wherein the fastener is threadably engaged with the turbocharger support bracket.

4. The internal combustion engine of claim 3, wherein a portion of a flange formed on the turbine is disposed between the interconnection tab and the interconnection pad.

* * * * *